US012791672B2

(12) United States Patent
Millischer

(10) Patent No.: US 12,791,672 B2
(45) Date of Patent: Nov. 10, 2026

(54) LIGHT DETECTION AND RANGING (LIDAR) SYSTEM HAVING TRANSMIT OPTICS FOR PRE-COLLIMATION STEERING

(71) Applicant: Aurora Operations, Inc., Pittsburgh, PA (US)

(72) Inventor: Martin Millischer, San Francisco, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1214 days.

(21) Appl. No.: 17/395,227

(22) Filed: Aug. 5, 2021

(65) Prior Publication Data

US 2022/0043124 A1 Feb. 10, 2022

Related U.S. Application Data

(60) Provisional application No. 63/062,657, filed on Aug. 7, 2020.

(51) Int. Cl.
*G01S 7/481* (2006.01)
*G01S 17/931* (2020.01)

(52) U.S. Cl.
CPC .......... *G01S 7/4815* (2013.01); *G01S 7/4816* (2013.01); *G01S 7/4817* (2013.01); *G01S 17/931* (2020.01)

(58) Field of Classification Search
CPC ...... G01S 17/88; G01S 7/4811; G01S 7/4813; G01S 7/4815; G01S 7/4816; G01S 7/4817
See application file for complete search history.

(56) References Cited

U.S. PATENT DOCUMENTS

| | | | | |
|---|---|---|---|---|
| 6,556,352 | B2 * | 4/2003 | Wang | G02B 19/0028 359/641 |
| 10,222,474 | B1 * | 3/2019 | Raring | H01S 5/02212 |
| 2015/0055117 | A1 | 2/2015 | Pennecot et al. | |
| 2017/0153319 | A1 * | 6/2017 | Villeneuve | G01S 7/484 |
| 2019/0162857 | A1 | 5/2019 | McCord et al. | |
| 2019/0248302 | A1 * | 8/2019 | Lee | H04N 23/698 |
| 2019/0257926 | A1 | 8/2019 | Zhang et al. | |

(Continued)

FOREIGN PATENT DOCUMENTS

| | | |
|---|---|---|
| JP | 2013210315 A | 10/2013 |
| JP | 2019529958 A | 10/2019 |

(Continued)

OTHER PUBLICATIONS

International Search Report and Written Opinion for Application No. PCT/US2021/044986, mailed Nov. 16, 2021, 13 pages.

*Primary Examiner* — Sharrief I Broome
*Assistant Examiner* — Journey F Sumlar
(74) *Attorney, Agent, or Firm* — Dority & Manning, P.A.

(57) ABSTRACT

A LIDAR system is provided. The LIDAR system includes a plurality of emitters respectively configured to emit a light signal along a transmit path. The LIDAR system includes a plurality of optics positioned along the transmit path. The plurality of optics includes a collimator optic having a primary optical power along a first axis. The plurality of optics further include one or more transmit optics positioned along the transmit path between the plurality of emitters and the collimator optic. Furthermore, the one or more transmit optics have a primary optical power along a second axis.

19 Claims, 16 Drawing Sheets

(56) References Cited

U.S. PATENT DOCUMENTS

| | | | | |
|---|---|---|---|---|
| 2019/0277950 | A1 | 9/2019 | Schwarz et al. | |
| 2020/0271788 | A1 * | 8/2020 | Lewis | G01S 7/4817 |
| 2020/0284883 | A1 * | 9/2020 | Ferreira | G01S 7/4914 |
| 2021/0278542 | A1 | 9/2021 | Murakami | |

FOREIGN PATENT DOCUMENTS

| | | | |
|---|---|---|---|
| JP | 2020531826 | A | 11/2020 |
| JP | 2021531509 | A | 11/2021 |
| WO | WO 2019037810 | A1 | 2/2019 |
| WO | WO 2020020499 | A1 | 1/2020 |
| WO | WO2020137079 | A1 | 2/2020 |

* cited by examiner

LIGHT DETECTION AND RANGING (LIDAR) SYSTEM HAVING TRANSMIT OPTICS FOR PRE-COLLIMATION STEERING

RELATED APPLICATION

The present application is based on and claims the benefit of priority of U.S. Provisional Patent Application No. 63/062,657 having a filing date of Aug. 7, 2020, which is incorporated by reference herein.

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The LIDAR system also includes circuitry to measure the time-of-flight (that is, the elapsed time from emitting the laser beam to detecting the reflected laser beam). The time-of-flight measurement is used to determine the distance of the LIDAR system to the object.

SUMMARY

Aspects and advantages of embodiments of the present disclosure will be set forth in part in the following description, or may be learned from the description, or may be learned through practice of the embodiments.

Example aspects of the present disclosure are directed to LIDAR systems (e.g., short-range LIDAR systems). As further described herein, the LIDAR systems can be used by various devices and platforms (e.g., robotic platforms, etc.) to improve the ability of the devices and platforms to perceive its environment and perform functions in response thereto (e.g., autonomously navigating through the environment).

For example, a LIDAR system of the present disclosure can include a plurality of emitters (e.g., laser diodes) respectively configured to emit a light signal (e.g., laser) along a transmit path. The LIDAR system can include a collimator optic disposed along the transmit path. The LIDAR system can further include one or more transmit optics disposed along the transmit path. More particularly, the one or more transmit optics can be disposed along the transmit path between the collimator optic and the plurality of emitters.

The collimator optic and the one or more transmit optics have a primary optical power along different axes. For instance, the collimator optic has a primary optical power along a first axis (e.g., fast axis). Conversely, the one or more transmit optics have a primary optical power along a second axis (e.g., slow axis). The second axis can be perpendicular or substantially perpendicular (e.g., less than a 15 degree difference, less than a 10 degree difference, less than a 5 degree difference, less than a 1 degree difference, etc.) to the first axis.

The primary optical power of the collimator optic along the first axis refers to a degree to which the collimator optic converges or diverges light signals along the first axis. Furthermore, the primary optical power of the one or more transmit optics along the second axis refers to a degree to which the one or more transmit optics converge or diverge light signals along the second axis.

The light signals can be steered along the one or more transmit optics to focus the light signals onto the collimator optic. In this manner, collimation of the light signals along the first axis can be improved. The one or more transmit optics can include one or more toroidal shaped optics to facilitate steering of the light signals. Furthermore, the one or more toroidal shaped optics can have a null radius of curvature and a uniform thickness to reduce or eliminate distortion of the light signals.

The LIDAR system can include a plurality of photodetectors. The photodetectors can be disposed on a curved surface of a circuit board. Furthermore, the photodetectors can be configured to detect reflected light signals traveling along a receive path that is separate from the transmit path.

The LIDAR system can include one or more receive optics positioned along the receive path. The one or more receive optics can be configured to focus each of the plurality of reflected light signals onto a corresponding photodetector. For instance, the one or more receive optics can include one or more aspheric lenses configured to focus the plurality of reflected light signals onto the plurality of photodetectors.

The LIDAR system can further include a plurality of condenser optics disposed along the receive path. One or more of the condenser optics can be positioned between the one or more receive optics and a corresponding photodetector of the plurality of photodetectors. Furthermore, the one or more condenser optics can condense the plurality of reflected light signals onto the corresponding photodetector. In this manner, a field of view of the photodetectors can be widened due, at least in part, to the condenser optics. Furthermore, since the plurality of reflected light signals are being directed onto each of the photodetectors, the LIDAR system can provide a continuous or near-continuous line of detection.

A LIDAR system according to example aspects of the present disclosure can provide numerous technical effects and benefits. For instance, the one or more transmit optics can facilitate pre-collimation steering of the light signals along the second axis (e.g., slow axis) to focus the light signals onto the collimator optic for collimation along the first axis. Additionally, the plurality of condenser optics positioned between the one or more receive optics and a corresponding photodetector of the plurality of photodetectors can widen a field of view of the plurality of photodetectors disposed on the curve surface of the circuit board.

In one example aspect of the present disclosure, a LIDAR system is provided according to an aspect of the present disclosure. The LIDAR system includes a plurality of emitters respectively configured to emit a light signal along a transmit path. The LIDAR system includes a plurality of first optics. The plurality of first optics are positioned along the transmit path. The plurality of first optics include a collimator optic having a primary optical power along a first axis. The plurality of first optics further include one or more transmit optics positioned between the collimator optic and the plurality of emitters.

In some implementations, the one or more transmit optics have a primary optical power along a second axis that is perpendicular or substantially perpendicular to the first axis.

In some implementations, the primary optical power of the collimator optic along the first axis is indicative of a degree to which the collimator optic converges or diverges light signals along the first axis. Furthermore, the primary optical power of the one or more transmit optics along the second axis is indicative of a degree to which the one or more transmit optics converge or diverge light signals along the second axis In some implementations, the primary optical power of the collimator optic includes a greatest optical power of the collimator optic. For instance, the primary optical power of the collimator optic along the first axis can be multiple times greater than the optical power of the collimator optic along any other axis (e.g., second axis). Furthermore, the primary optical power of the one or more transmit optics includes a greatest optical power of the one or more transmit optics. For instance, the primary optical power of the one or more transmit optics along the second axis can be multiple times greater than the optical power of the one or more transmit optics along any other axis (e.g., first axis).

In some implementations, the one or more transmit optics include one or more toroidal shaped optics. The one or more toroidal shaped optics define a circumferential direction and a radial direction. In some implementations, a radius of curvature of the one or more toroidal shaped optics has a constant thickness along the circumferential direction.

In some implementations, the collimator optic has a first focal length and the one or more transmit optics have a second focal length that is longer than the first focal length. In some implementations, the first focal length corresponds to a width of a first emitter of the plurality of emitters. Furthermore, the second focal length corresponds to a length of the first emitter. The length of the first emitter is longer than the width of the first emitter. In some implementations, a ratio of the second focal length to the first focal length ranges from about 16:1 to about 24:1.

In some implementations, one or more of the plurality of emitters includes a laser diode. Furthermore, in such implementations, the light signal emitted from the one or more emitters that include the laser diode is a laser signal.

In some implementations, the LIDAR system includes a plurality of photodetectors. Furthermore, one or more of the photodetectors is disposed along a curved surface of a circuit board. In some implementations, the curve surface includes a Petzval surface. The LIDAR system further includes a plurality of second optics disposed positioned along a receive path such that a plurality of reflected light signals traveling along the receive path pass through the plurality of second optics.

In some implementations, the plurality of second optics include one or more receive optics and a plurality of condenser optics. Furthermore, one or more of the condenser optics is positioned along the receive path between the one or more receive optics and a corresponding photodetector of the plurality of photodetectors.

In some implementations, the LIDAR system includes a housing that includes a partition wall dividing an interior of the housing into a first cavity and a second cavity. The plurality of emitters and the plurality of first optics are disposed within the first cavity. The plurality of photodetectors and the plurality of second optics are disposed within the second cavity.

In some implementations, the LIDAR system includes one or more mirrors disposed within the housing and positioned along the transmit path such that the one or more mirrors are positioned between the one or more transmit optics and the plurality of emitters. Furthermore, the one or more mirrors are rotatable about the first axis or the second axis. In some implementations, the one or more mirrors include a polygon mirror.

In some implementations, the one or more mirrors include a mirror rotatable about the first axis at a rotational speed ranging from about 15,000 revolutions per minute to about 20,000 revolutions per minute. In some implementations, the mirror includes a single-sided mirror.

In another example aspect of the present disclosure, an autonomous vehicle is provided. The autonomous vehicle includes a LIDAR system. The LIDAR system includes a plurality of emitters respectively configured to emit a light signal along a transmit path. The LIDAR system further includes a plurality of first optics positioned along the transmit path. The plurality of first optics include a collimator optic having a primary optical power along a first axis. The plurality of first optics further include one or more transmit optics positioned between the collimator optic and the plurality of emitters.

Yet another aspect of the present disclosure is directed to an autonomous vehicle control system. The autonomous vehicle control system includes a LIDAR system. The LIDAR system includes a plurality of emitters respectively configured to emit a light signal along a transmit path. The LIDAR system further includes a plurality of first optics positioned along the transmit path. The plurality of first optics include a collimator optic having a primary optical power along a first axis. The plurality of first optics further include one or more transmit optics positioned between the collimator optic and the plurality of emitters.

Other example aspects of the present disclosure are directed to other systems, methods, vehicles, apparatuses, tangible non-transitory computer-readable media, and devices for motion prediction and/or operation of a device including a LIDAR system having one or more transmit optics for pre-collimation steering.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

As used herein, use of the term "about" or "substantially" in conjunction with a stated numerical value refers to a range of values within 25% of the stated numerical value.

Figure 1:
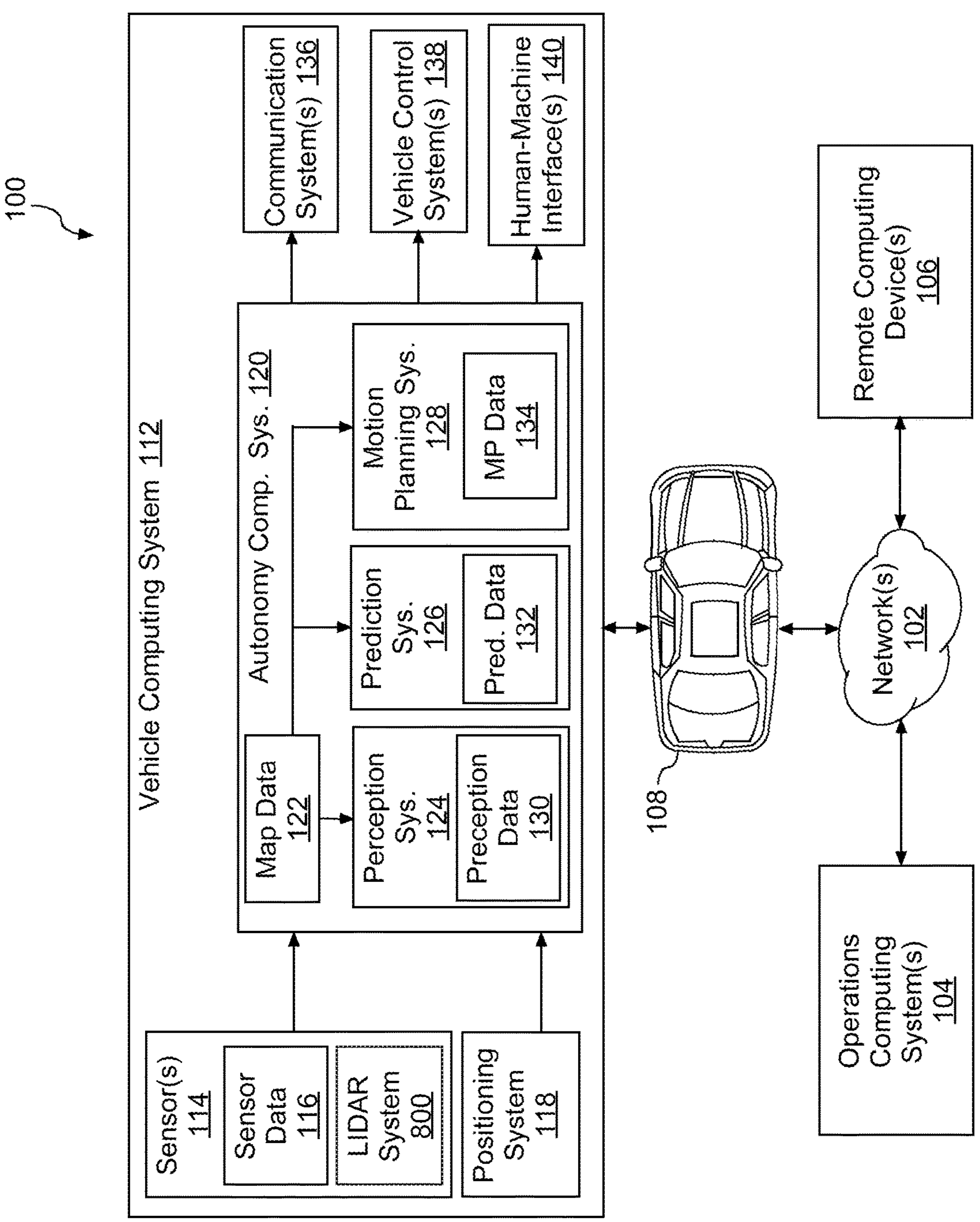
FIG. 1 depicts a block diagram of an example system for controlling the computational functions of an autonomous vehicle according to some implementations of the present disclosure.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an air-based vehicle (e.g., aircraft, etc.), a water-based vehicle (e.g., a boat, a submersible vehicle, an amphibious vehicle, etc.), a robotic device (e.g.

a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver.

The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can represent or include, for example, an autonomous vehicle control system. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for obtaining, processing, and/or otherwise utilizing sensor data collected through the described LIDAR technology, perceiving a surrounding environment, predicting future environmental states, and planning/controlling the motion of the vehicle 108.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, signage, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. One or more of these systems can be combined into a single system performing the functions thereof and/or share computing resources. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain perception data 130 descriptive of a current and/or past state of an object that is proximate to the vehicle 108. The perception data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive perception data 130 (e.g., from the perception system 124) associated with one or more objects within the surrounding environment of the vehicle 108. The prediction system 126 can input the perception data 130 (e.g., BEV image, LIDAR data, etc.) into the machine-learned prediction model to determine trajectories of the one or more objects based on the perception data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within a certain distance (e.g., one kilometer, etc.) of the vehicle 108 including the locations of objects around the vehicle 108. A passenger of the vehicle 108 can interact with the one or more human-machine interfaces 140 by touching a touchscreen display device associated with the one or more human-machine interfaces.

In some implementations, the vehicle computing system 112 can perform one or more operations including activating, based at least in part on one or more signals or data (e.g., the sensor data 116, the map data 122, the perception data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
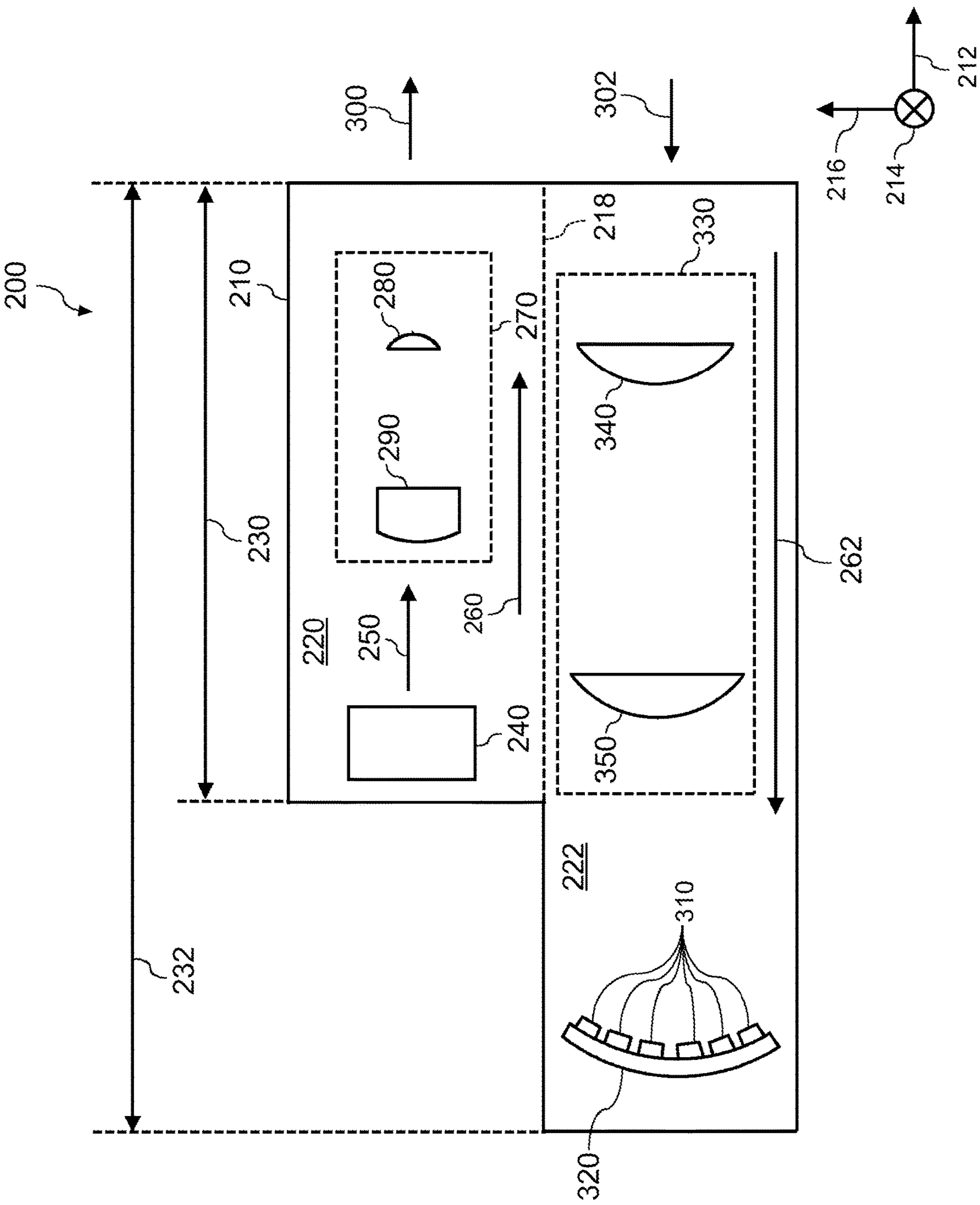
FIG. 2 depicts a block diagram of components of a LIDAR system according to some implementations of the present disclosure.

Referring now to FIG. 2, a LIDAR system 200 is provided according to some implementations of the present disclosure. The LIDAR system 200 can include a housing 210. The housing 210 can define a lateral direction 212, a longitudinal direction 214, and a vertical direction 216. It should be understood that the lateral direction 212, the longitudinal direction 214, and the vertical direction 216 are mutually perpendicular to one another. In some implementations, the housing 210 can include a partition wall 218 to divide the interior of the housing 210 into a first cavity 220 and a second cavity 222. For instance, the partition wall 218 can divide the interior of the housing 210 such that the first cavity 220 and the second cavity 222 are spaced apart from one another along the vertical direction 216.

As shown, the first cavity 220 can span a first distance 230 along the longitudinal direction 214. Additionally, the second cavity 222 can span a second distance 232 along the longitudinal direction 214. In some implementations, the first distance 230 can be different (e.g., longer, shorter) than the second distance 232. In alternative implementations, the first distance 230 and the second distance 232 can be the same.

The LIDAR system 200 can include a plurality of emitters 240 (only one shown). In some implementations, the plurality of emitters 240 can be disposed within the interior of the housing 210. For instance, in some implementations, the plurality of emitters 240 can be positioned within the first cavity 220 of the housing 210.

The plurality of emitters 240 can respectively be configured to emit a light signal 250 (only one shown) along a transmit path 260. In some implementations, one or more of the emitters 240 can include a laser diode. In such implementations, the light signal 250 emitted from the one or more laser diodes can be a laser signal.

The LIDAR system 200 can include a plurality of first optics 270 positioned along the transmit path 260. In this manner, the plurality of light signals 250 can pass through the plurality of first optics 270. In some implementations, the plurality of first optics 270 can be positioned within the interior of the housing 210. For instance, the plurality of first optics 270 can be positioned within the first cavity 220. The plurality of first optics 270 can shape the plurality of light signals 250 for propagation over a distance as transmit signals 300 (only one shown). It should be understood that the plurality of transmit signals 300 can collectively be referred to as a light beam.

In some implementations, the plurality of first optics 270 can include a collimator optic 280 (e.g., collimator). The collimator optic 280 can be configured to align the plurality of light signals 250 along an axis (e.g., fast axis). It should be understood that the axis corresponds to one of the axes (e.g., fast axis, slow axis) along which the light signals 250 are polarized. It should also be understood that light signals 250 polarized along the fast axis encounter a lower index of refraction and travel faster through optics than light signals 250 polarized along the slow axis. In some implementations, the collimator optic 280 can include one or more optics configured to align the plurality of light signals 250 along an axis. For example, in some implementations, the one or more optics can include a toroidal shaped optic.

The plurality of first optics 270 can include one or more transmit optics 290. As shown, the one or more transmit optics 290 can be positioned along the transmit path 260 between the collimator optic 280 and the plurality of emitters 240. As will be discussed later on in more detail, the one or more transmit optics 290 can be configured to focus the plurality of light signals 250 onto the collimator optic 280.

The LIDAR system 200 can include a plurality of photodetectors 310. In some implementations, one or more of the photodetectors 310 can include an avalanche photodiode. In some implementations, the plurality of photodetectors 310 can be disposed within the housing 210 of the LIDAR system 200. For instance, the plurality of photodetectors 310 can be disposed within the second cavity 222 of the housing 210. In such implementations, the plurality of photodetectors 310 can be spaced apart from the plurality of emitters 240 along the vertical direction 216.

In some implementations, the photodetectors 310 can be disposed on a circuit board 320. More specifically, the photodetectors 310 can be disposed on a curved surface of the circuit board 320. In some implementations, the curved surface can include a Petzval surface. Alternatively, or additionally, the plurality of photodetectors 310 can be spaced apart from one another along the curved surface of the circuit board 320 such that the plurality of photodetectors 310 are uniformly spaced along the curved surface of the circuit board 320. For instance, in some implementations, adjacent photodetectors 310 can be spaced apart from one another by a distance ranging from 1 millimeter to 10 millimeters.

The plurality of photodetectors 310 can detect a plurality of return signals 302 traveling along a receive path 262 that is separate from the transmit path 260. It should be understood that each of the transmit signals 300 can reflect off of one or more objects in an environment surrounding the LIDAR system 200 and can be detected by the plurality of photodetectors 310 of the LIDAR system 200 as one of the plurality of return signals 302. For instance, in some implementations, the return signals 302 can enter the second cavity 222 of the housing 210 of the LIDAR system 200.

The LIDAR system 200 can include a plurality of second optics 330 positioned along the receive path 262. In some implementations, the plurality of second optics 330 can be positioned within the interior of the housing 210. For instance, the plurality of second optics 330 can be positioned within the second cavity 322 of the housing 210.

The plurality of second optics 330 can include one or more receive optics 340. The one or more receive optics 340 can be configured to focus the return signals 302 onto the plurality of photodetectors 310. In some implementations, the one or more receive optics 340 can be configured to focus return signals 302 having an angle ranging from 45 degrees below an axis to 45 degrees above an axis (e.g., a central axis of the receive optics 340). In some implementations, the one or more receive optics 340 can be positioned within the housing 210 such that the central axis thereof is parallel or substantially parallel to the longitudinal direction 214 of the housing 210. Thus, in such implementations, the one or more receive optics 340 can be configured to focus return signals 302 having an angle ranging from 45 degrees above the central axis (e.g., longitudinal direction 214) to 45 degrees below the central axis.

In some implementations, the plurality of second optics 330 can include a plurality of condenser optics 350 (only one shown). One or more of the plurality of condenser optics 350 can be positioned along the receive path 362 between the one or more receive optics 340 and a corresponding photodetector of the plurality of photodetectors 310. In this manner, the one or more condenser optics 350 can be configured to focus the plurality of return signals 302 onto the corresponding photodetector of the plurality of photodetectors 310.

In some implementations, a total number of the photodetectors 310 can be different than a total number of the emitters 240. For instance, in some implementations, the total number of photodetectors 310 included in the LIDAR system 200 can be greater than the total number of emitters 240 included in the LIDAR system 200.

Figure 3:
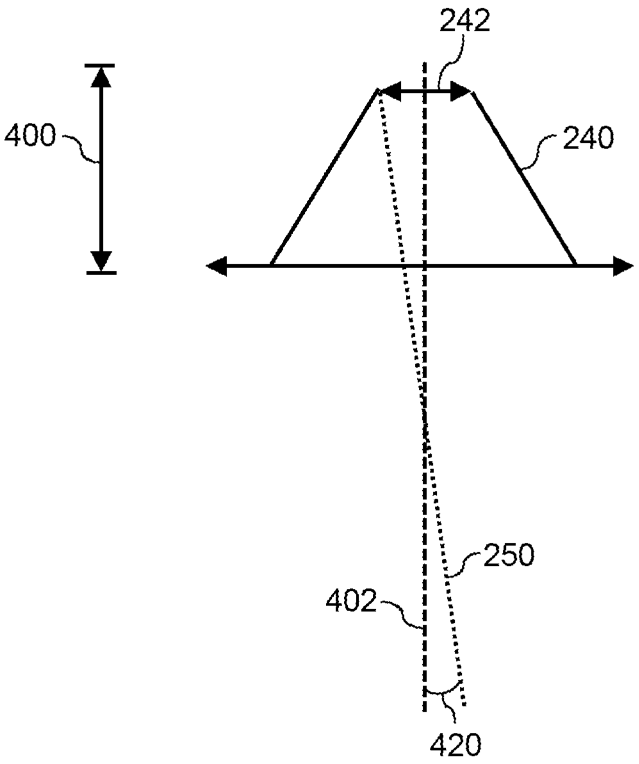
FIG. 3 depicts a divergence angle between a fast axis and a light signal emitted from an emitter of a LIDAR system according to some implementations of the present disclosure.
Figure 4:
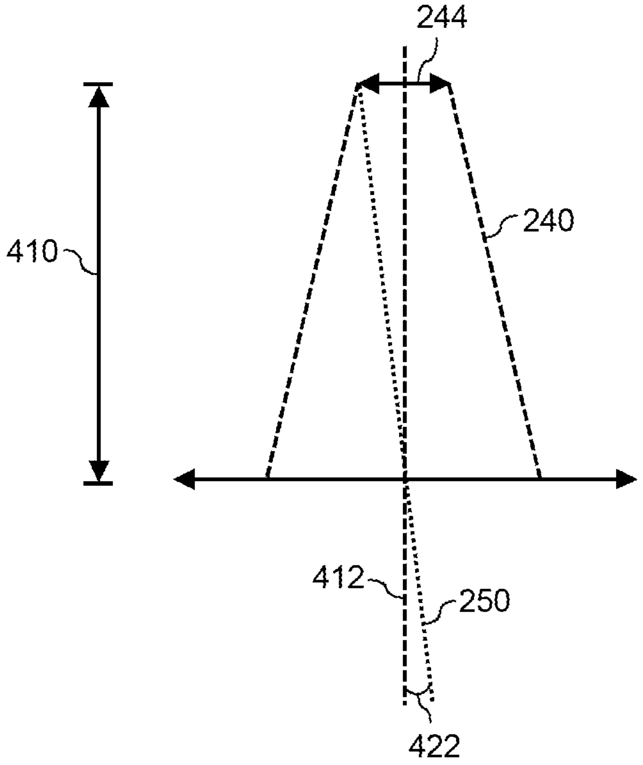
FIG. 4 depicts a divergence angle between a slow axis and a light signal emitted from an emitter of a LIDAR system according to some implementations of the present disclosure.

Referring now to FIGS. 3 and 4, cross-sectional views of one of the emitters 240 are provided according to some implementations of the present disclosure. FIG. 3 depicts a cross-sectional view of the emitter 240 in a first plane. FIG. 4 depicts a cross-sectional view of the emitter 240 in a second plane that is perpendicular or substantially perpendicular to the first plane.

In some implementations, a width 242 of the emitter 240 can be different than a length 244 of the emitter 240. For instance, the length 244 of the emitter 240 can be longer than the width 242 of the emitter 240. In some implementations, a ratio of the length 244 of the emitter 240 to the width 242 of the emitter 240 can range from about 16:1 to about 24:1.

In some implementations, the emitter 240 can have a first focal length 400 along a first axis 402 (e.g., fast axis) and a second focal length 410 along a second axis 412 (e.g., slow axis) that is perpendicular or substantially perpendicular to the first axis 402. Furthermore, in some implementations, the second focal length 410 can be longer than the first focal length 400. For instance, in some implementations, the ratio of the second focal length 410 to the first focal length 400 can range from 16:1 to 24:1.

In some implementations, the light signal 250 emitted from the emitter 240 can diverge from the first axis 402 and the second axis 412. For instance, the light signal 250 can diverge from the first axis 402 such that a first divergence angle 420 is defined between the light signal 250 and the first axis 402. Additionally, the light signal 250 can diverge from the second axis 412 such that a second divergence angle 422 is defined between the light signal 250 and the second axis 412.

Figure 5:
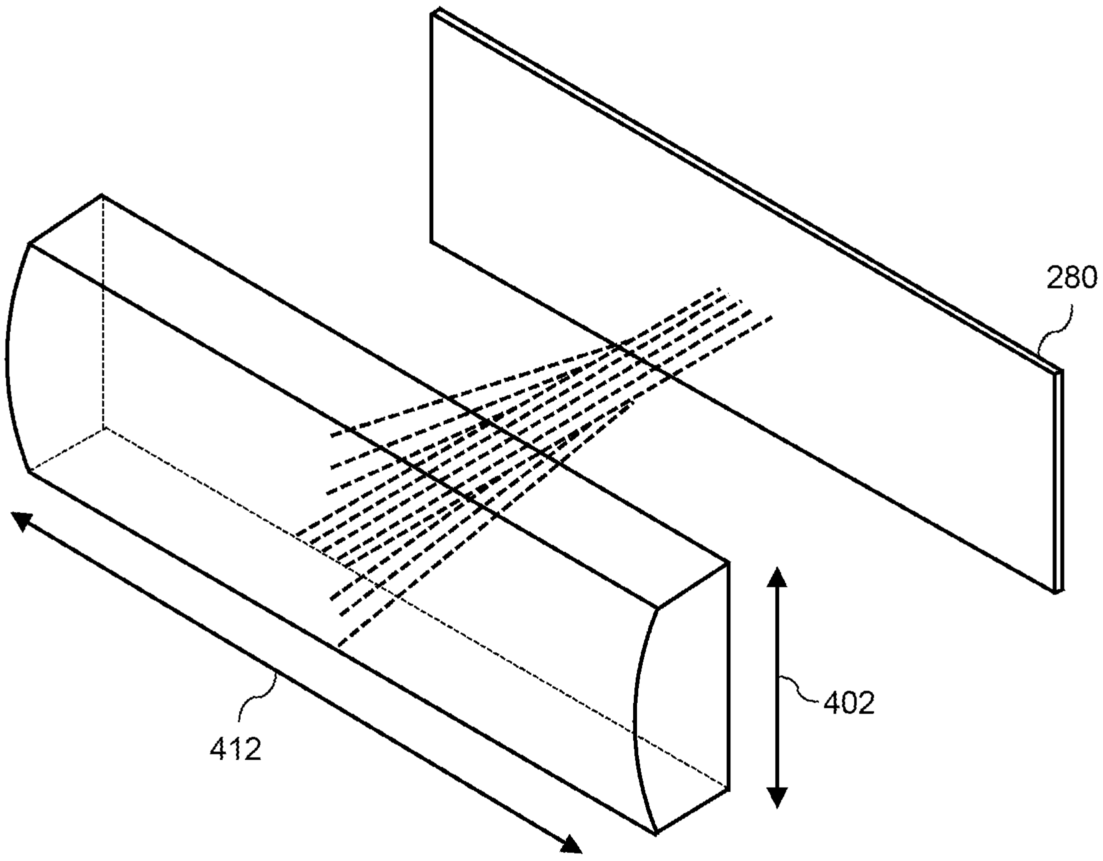
FIG. 5 depicts optical power of a collimator optic of a LIDAR system along a fast axis according to some implementations of the present disclosure.
Figure 6:
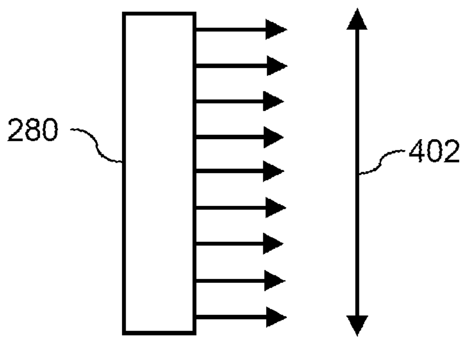
FIG. 6 depicts optical power of a transmit optic of a LIDAR system along a slow axis according to some implementations of the present disclosure.

Referring now to FIGS. 5 and 6, the collimator optic 280 can have a primary optical power along the first axis 402. In this manner, the collimator optic 280 can collimate the light signals 250 along the first axis 402. In some implementations, the primary optical power of the collimator optic 280 along the first axis 402 can be a greatest optical power of the collimator optic 280.

It should be understood that the primary optical power of the collimator optic 280 along the first axis 402 can be multiple times greater than the optical power of the collimator optic 280 along any other axis (e.g., second axis 412). For example, the primary optical power of the collimator optic 280 along the first axis 402 can be at least 3 times greater than the optical power of the collimator optic 280 along any other axis (e.g., second axis 412). In some implementations, the primary optical power of the collimator optic 280 along the first axis 402 can be at least 5 times greater than the optical power of the collimator optic 280 along any other axis (e.g., second axis 412). In some implementations, the primary optical power of the collimator optic 280 along the first axis 402 can be at least 10 times greater than the optical power of the collimator optic 280 along any other axis (e.g., second axis 412).

The one or more transmit optics 290 can have a primary optical power along the second axis 412. In this manner, the one or more transmit optics 290 can steer the light signals 250 to focus the light signals 250 onto the collimator optic 280. In some implementations, the primary optical power of the one or more transmit optics 290 along the second axis 412 can be a greatest optical power of the one or more transmit optics 290.

It should be understood that the primary optical power of the one or more transmit optics 290 along the second axis 412 can be multiple times greater than the optical power of the one or more transmit optics 290 along any other axis (e.g., first axis 402). For example, the primary optical power of the one or more transmit optics 290 along the second axis can be at least 3 times greater than the optical power of the one or more transmit optics 290 along any other axis (e.g., first axis 402). In some implementations, the primary optical power of the one or more transmit optics 290 along the second axis 412 can be at least 5 times greater than the optical power of the one or more transmit optics 290 along any other axis (e.g., first axis 402). In some implementations, the primary optical power of the one or more transmit optics 290 along the second axis 412 can be at least 10 times greater than the optical power of the one or more transmit optics 290 along any other axis (e.g., first axis 402).

In some implementations, a first focal length associated with the collimator optic 280 can be different than a second focal length associated with the one or more transmit optics 290. For instance, the first focal length can be shorter than the second focal length. In some implementations, the first focal length can correspond to the width 242 (FIGS. 3 and 4) of one of the emitters 440 (e.g., laser diode), whereas the second focal length can correspond to the length 244 (FIG. 4) of one of the emitters 240 (e.g., laser diode). For instance, the ratio of the second focal length (e.g., width 242 of one of the emitters 240) to the first focal length (e.g., length 244 of one of the emitters 240) can range from about 16:1 to about 24:1. In this manner, a divergence angle (e.g., first divergence angle 420, second divergence angle 422) between the light signals 250 and one or more axes (e.g., first axis 402, second axis 412) can be reduced due, at least in part, to the second focal length associated with the one or more transmit optics 290 being a multiple of the first focal length associated with the collimator optic 280.

In some implementations, the one or more transmit optics 290 can include a first transmit optic and a second transmit optic. Furthermore, in some implementations, the first transmit optic can have a first focal length, whereas the second transmit optic can have a second focal length that is different (e.g., shorter, longer) than the first focal length. In this manner, a point at which the transmit signals 300 (FIG. 2) converge in an environment surrounding the LIDAR system 200 can be modified (e.g., lengthened or shortened).

Figure 7:
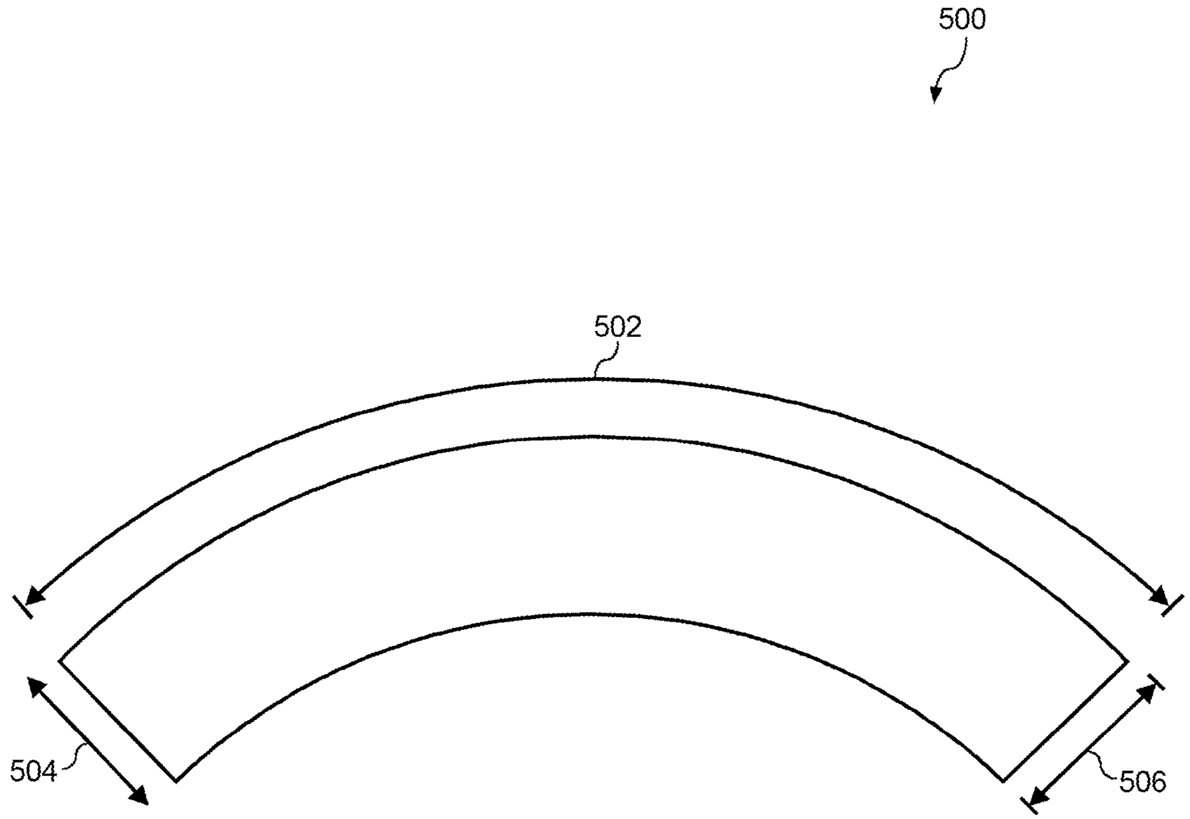
FIG. 7 depicts a top view of a toroidal shaped transmit optic of a LIDAR system according to some implementations of the present disclosure.

Referring now to FIG. 7, a top view of a toroidal shaped optic 500 is provided according to some implementations of the present disclosure. It should be understood that the one or more transmit optics 290 (FIG. 2) of the LIDAR system 200 discussed above with reference to FIG. 2 can include one or more toroidal shaped optics 500. As shown, the toroidal shaped optic 500 can define a circumferential direction 502 and a radial direction 504. In some implementations, the toroidal shaped optic 500 can have a constant thickness 506 along the circumferential direction 502. In this manner, distortion of the light signals 250 (FIG. 2) due to the one or more transmit optics 290 having a non-uniform thickness can be prevented. Furthermore, the null radius of curvature of the toroidal shaped optic 500 can facilitate 90 degree steering of the light signals 250 (FIG. 2).

Figure 8:
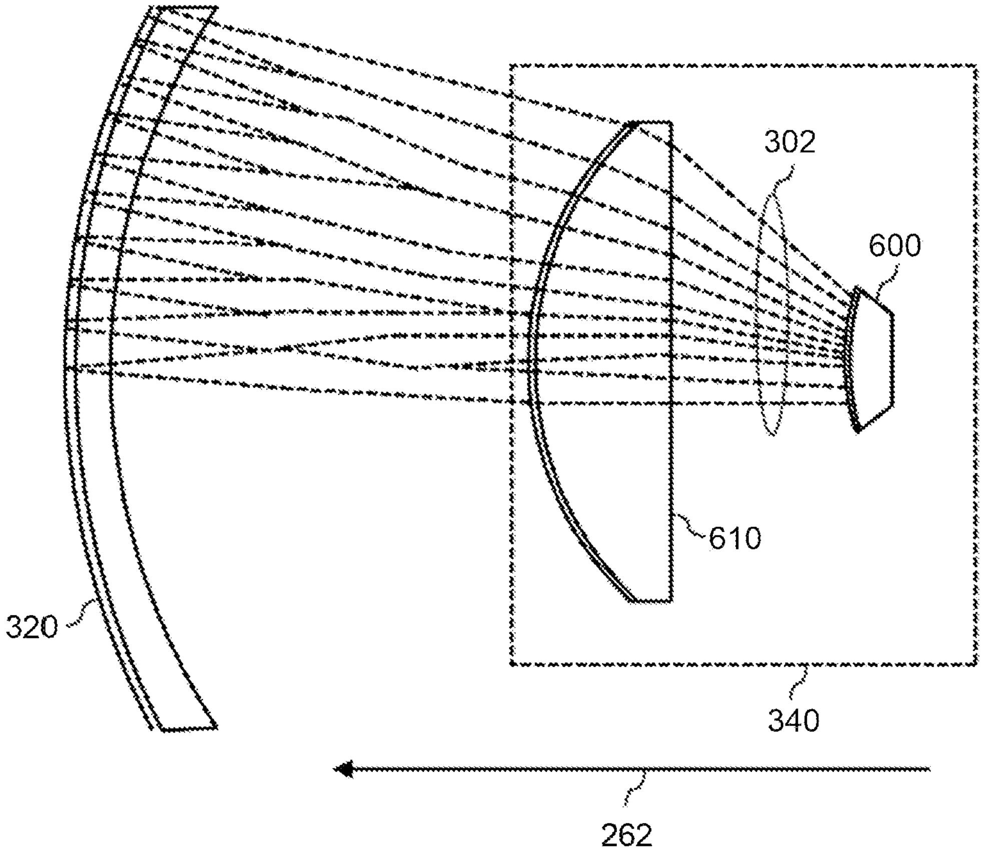
FIG. 8 depicts receive optics of a LIDAR system according to some implementations of the present disclosure.

Referring now to FIG. 8, the one or more receive optics 340 are provided according to some implementations of the present disclosure. As shown, the one or more receive optics 340 can, in some implementations, include a first receive optic 600 and a second receive optic 610. The first receive optic 600 can be positioned at a first location along the receive path 262. The second receive optic 610 can be positioned at a second location along the receive path 262. The second location can be closer to the plurality of photodetectors 310 than the first location. In this manner, the second receive optic 610 can be positioned along the receive path 262 between the first receive optic 600 and the plurality of photodetectors 310.

In some implementations, the first receive optic 600 can include a conical mirror. Alternatively, or additionally, the second receive optic 610 can include an aspheric lens. It should be understood that the aspheric lens can include a first aspheric surface and a second aspheric surface.

In some implementations, the first receive optic 600 and the second receive optic 610 can each include an aspheric lens. In such implementations, the receive optics 340 can include four aspheric surfaces (e.g., two aspheric surfaces associated with the first receive optic 600 and two aspheric surfaces associated with the second receive optic 610). As shown, the first receive optic 600 and the second receive optic 610 can focus each of the return signals 302 onto a corresponding photodetector of the plurality of photodetectors 310 (FIG. 2) disposed on the curved surface of the circuit board 320.

Figure 9:
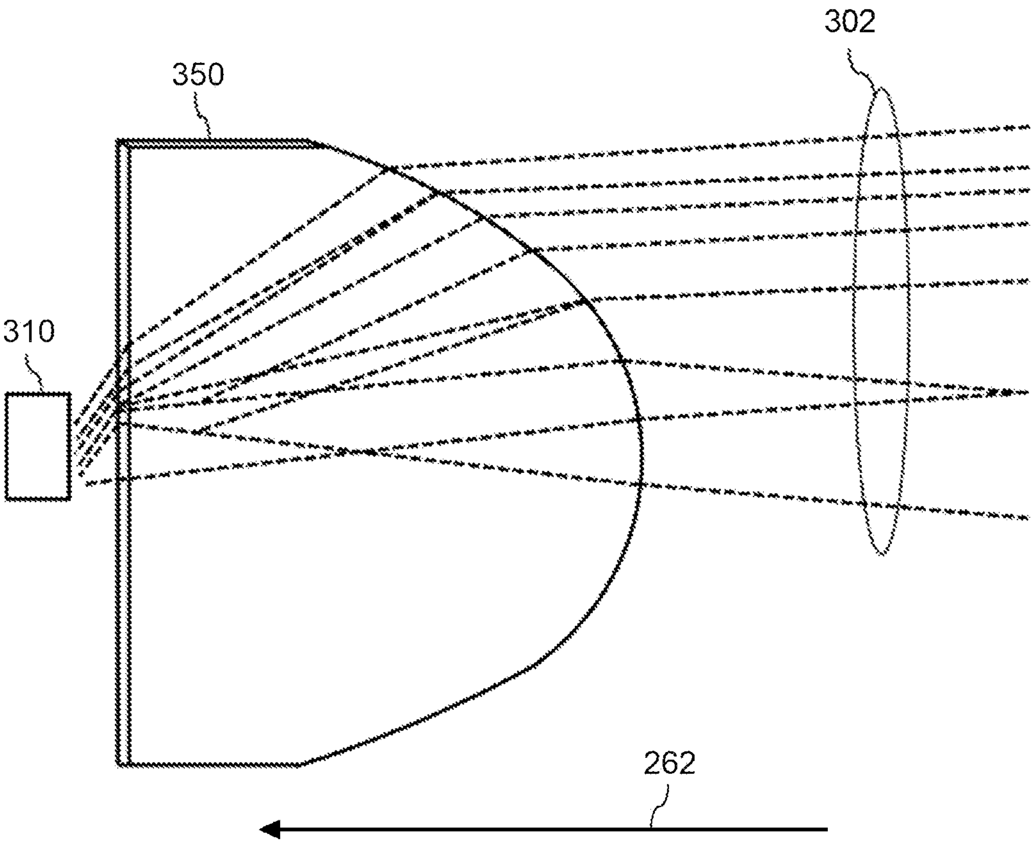
FIG. 9 depicts a condenser optic of a LIDAR system according to some implementations of the present disclosure.

Referring now to FIG. 9, one of the plurality of condenser optics 350 is shown according to some implementations of the present disclosure. As shown, the condenser optic 350 can be configured to condense each of the return signals 302 onto a corresponding photodetector of the plurality of photodetectors 310. In this manner, a field of view of the photodetectors 310 can be widened due, at least in part, to the condenser optic 350. In some implementations, the condenser optic 350 can include a right angle condenser optic.

Figure 12:
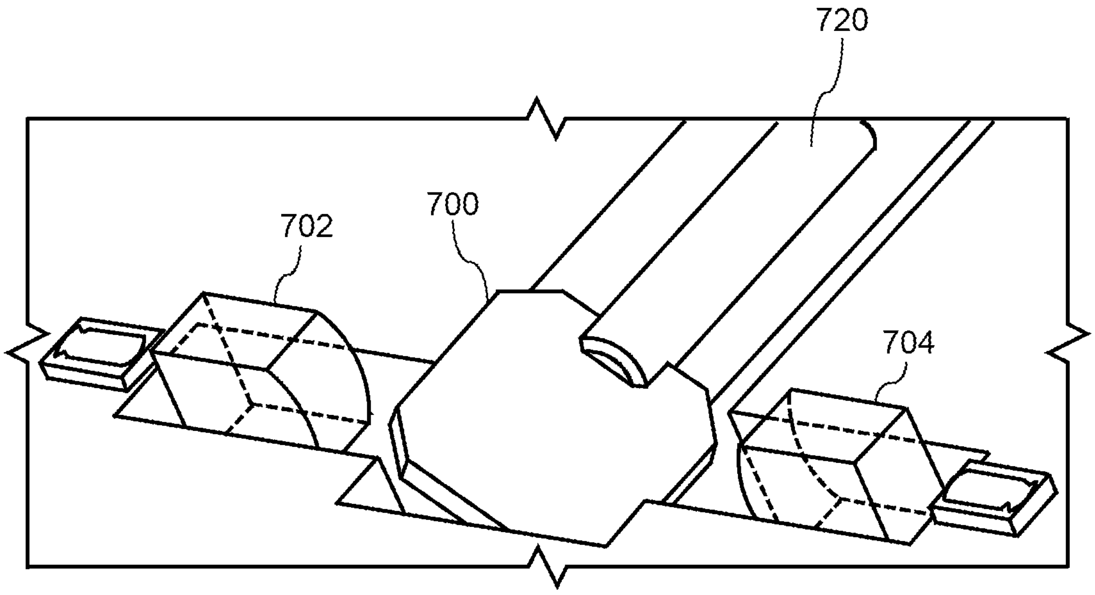
FIG. 12 depicts a zoomed-in portion of FIG. 11 according to some implementations of the present disclosure.
Figure 13:
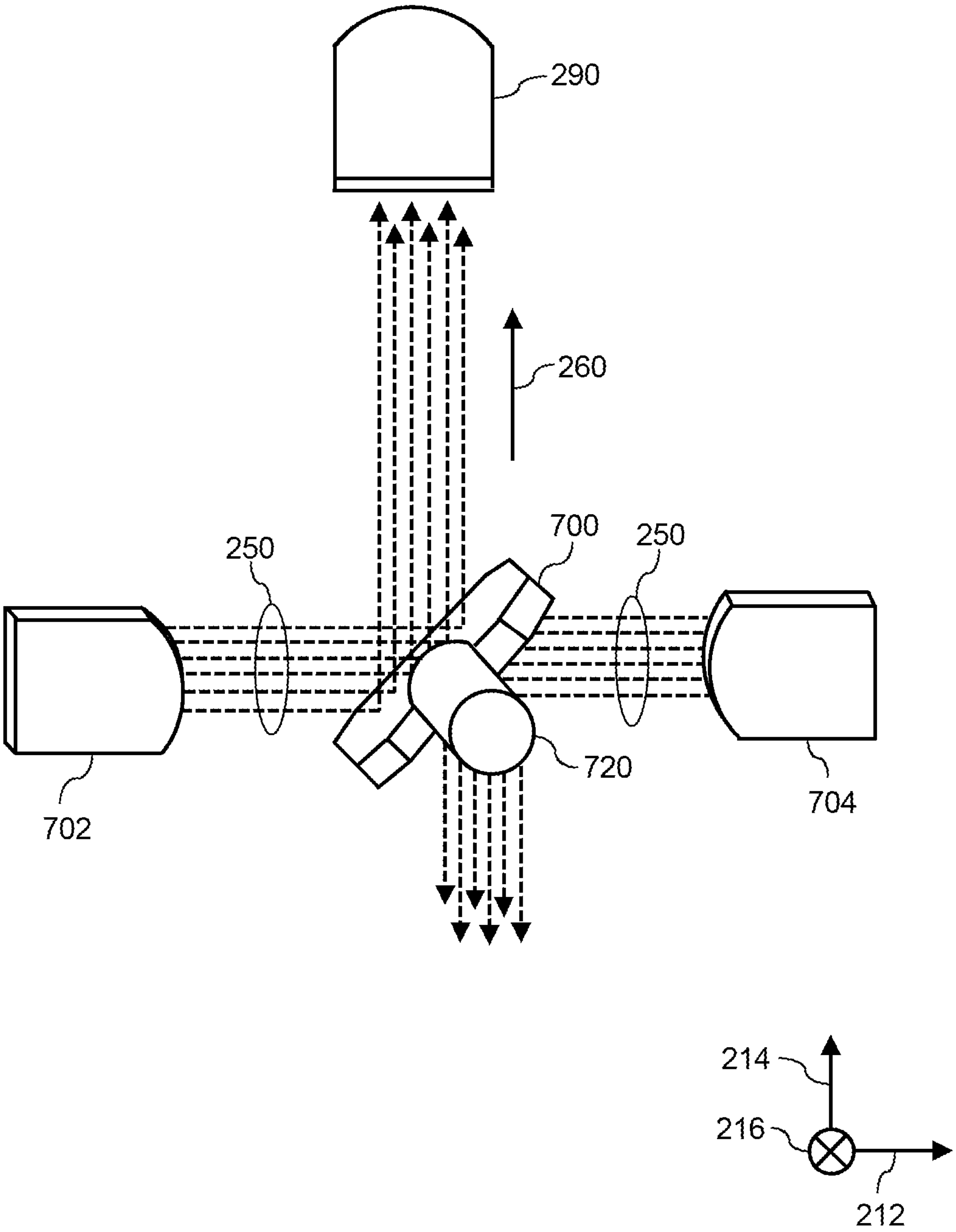
FIG. 13 depicts a mirror of the LIDAR system of FIG. 10 reflecting light signals according to some implementations of the present disclosure.

Referring now to FIGS. 10 through 13, the LIDAR system 200 is provided according to some implementations of the present disclosure. As shown in FIG. 12, the LIDAR system 200 can include a first mirror 700. In some implementations, the first mirror 700 can be positioned within the interior of the housing 210. For instance, the first mirror 700 can be positioned within the first cavity 220 (FIG. 11) of the housing 210. As shown in FIG. 13, the first mirror 700 can be positioned between a first emitter 702 of the LIDAR system 200 and a second emitter 704 of the LIDAR system 200 along the lateral direction 212. It should be understood that the first emitter 702 and the second emitter 704 can operate in substantially the same manner as the emitters 240 discussed above with reference to FIGS. 3 and 4.

Figure 10:
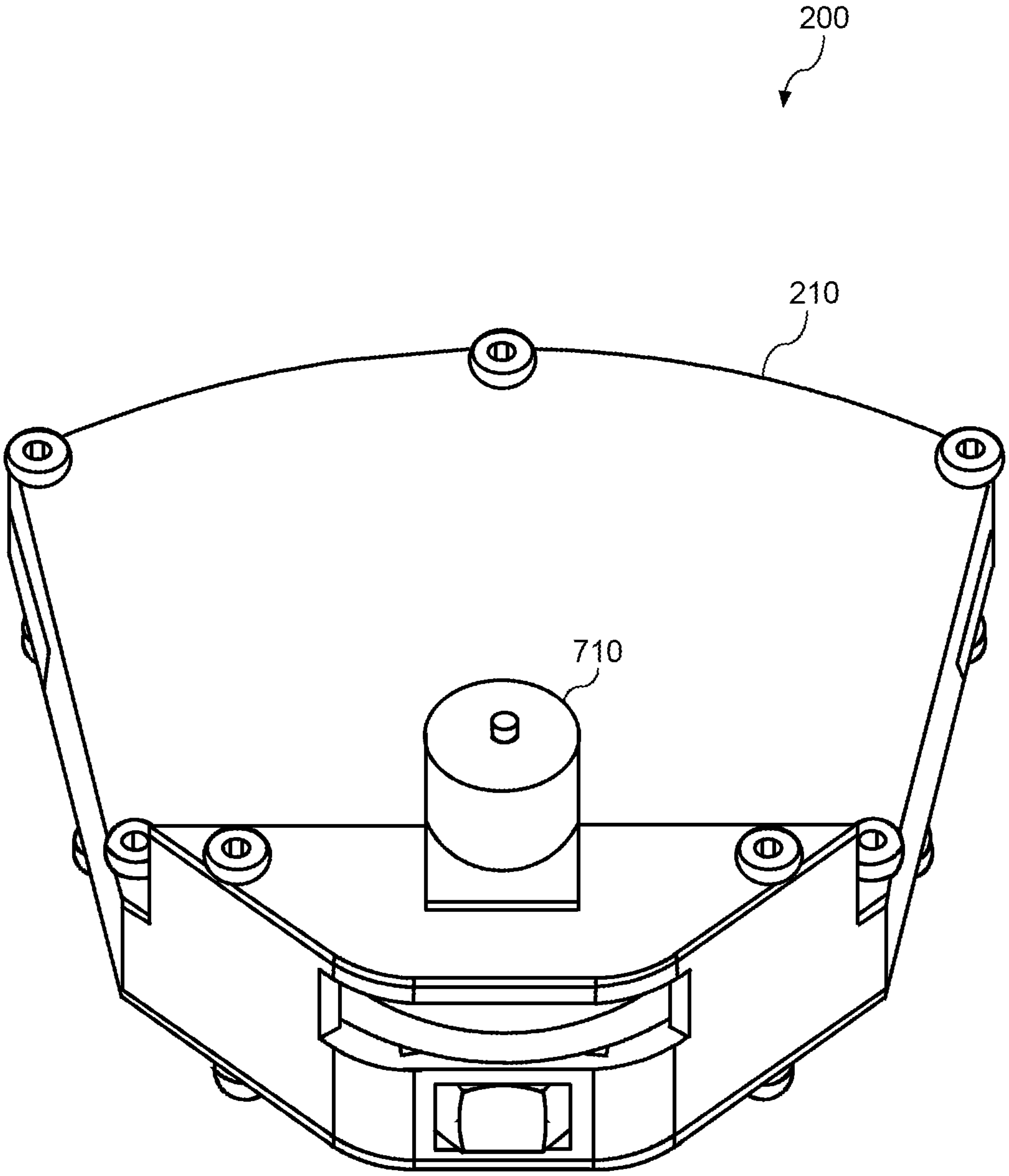
FIG. 10 depicts a LIDAR system according to some implementations of the present disclosure.
Figure 11:
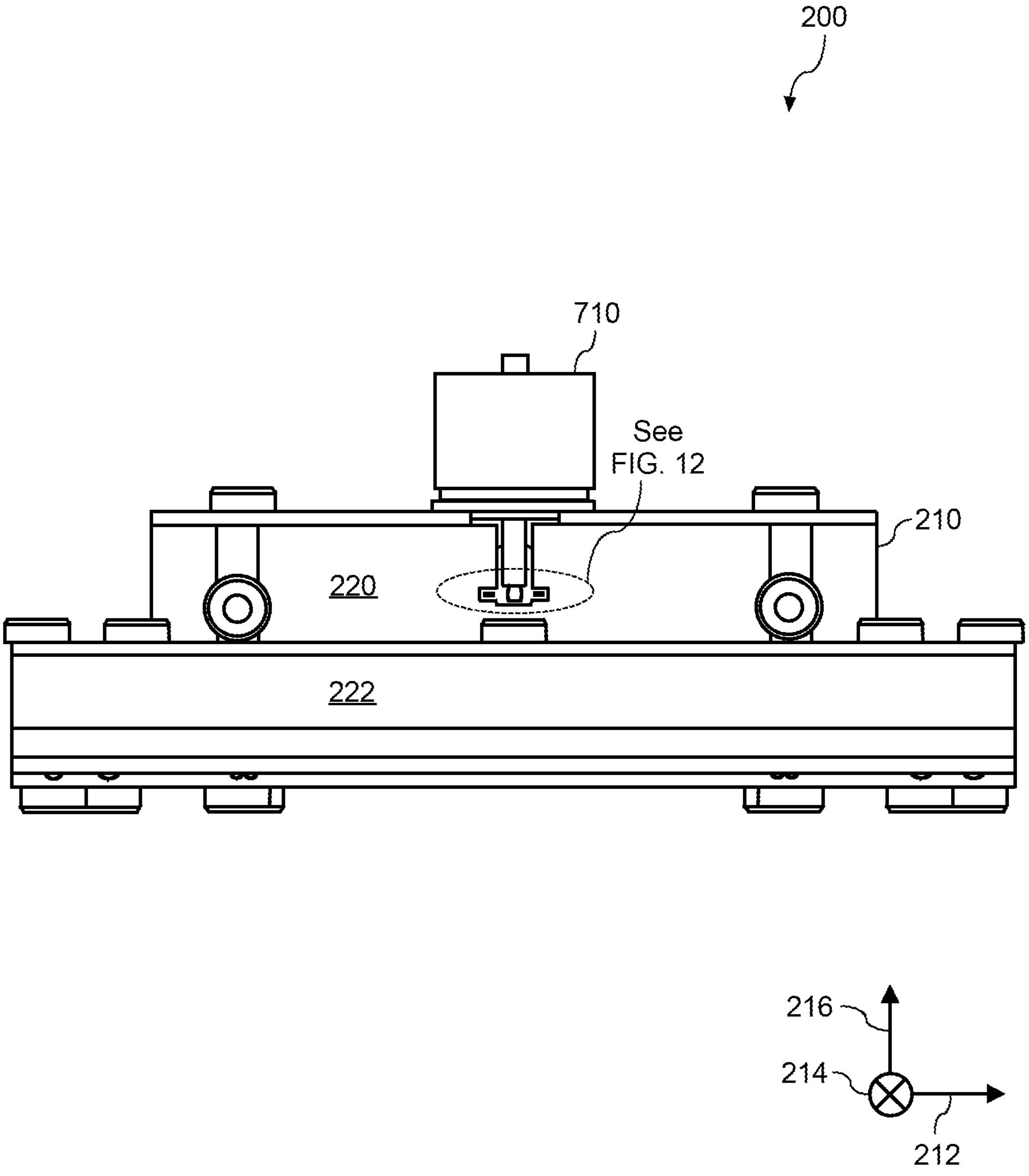
FIG. 11 depicts a cross-sectional view of a housing of the LIDAR system of FIG. 10 according to some implementations of the present disclosure.

In some implementations, as shown in FIG. 10, the first mirror 700 can be rotatably coupled to an electric motor 710 (e.g., brushless motor). For instance, the first mirror 700 can be rotatably coupled to the electric motor 710 via a shaft 720, shown in FIG. 11. In this manner, the electric motor 710 can drive rotation of the shaft 720 to rotate the first mirror 700. In some implementations, the first mirror 700 can be rotatable along a first axis (e.g., first axis 402 in FIG. 3, a fast axis) associated with the light signal 250 emitted from the first emitter 702 and the second emitter 704

In some implementations, the LIDAR system 200 can include a second mirror (not shown) rotatably coupled to a second electric motor (also not shown) via a second shaft. In such implementations, the second electric motor can drive rotation of the second shaft to rotate the second mirror about a second axis (e.g., second axis 412 in FIG. 4, a slow axis) associated with the light signals 250 emitted from the first emitter 702 and the second emitter 704. In some implementations, the second mirror can include a square mirror. It should be appreciated, however, that the second mirror can have any suitable shape.

In some implementations, the first mirror 700 and the second mirror can be rotated at different speeds. For instance, in some implementations, the first mirror 700 can be rotated at a first rotational speed that is faster than a second rotational speed at which the second mirror is rotated. In some implementations, the first rotational speed can range from about 15,000 revolutions per minute to about 20,000 revolutions per minute. Alternatively, or additionally, the second rotational speed can range from about 100 revolutions per minute to about 200 revolutions per minute.

In some implementations, with reference to FIG. 13, the first mirror 700 be a single sided mirror. In such implementations, the first mirror 700 can direct the light signal 250 emitted from the first emitter 702 towards the one or more transmit optics 290 for a first half of a revolution of the first mirror 700. Additionally, the first mirror 700 can direct the light signal 250 emitted from the second emitter for a second half of the revolution of the first mirror. It should be understood that the revolution of the first mirror 700 refers to one complete rotation of the first mirror 700 about a first axis.

In some implementations, the backside of the first mirror 700 can be used for light encoding. For instance, the light signal emitted 250 from the second emitter 704 can reflect off the first mirror 700 during the first half of the revolution. Furthermore, in some implementations, the light signal 250 reflecting off of the backside of the first mirror 700 can be directed towards circuitry associated with light encoding. In this manner, the circuitry can process the light signal 250 reflecting off of the backside of the first mirror 700.

In some implementations, the first mirror 700 can include a flat mirror. In this manner, the light signals 250 can be steered via the first mirror 700 without needing to modify a wavefront of the first mirror 700. It should be understood, however, that the first mirror 700 can have any suitable shape. For instance, in some implementations, the first mirror 700 can include a pyramid mirror or an elliptical mirror. In alternative implementations, the first mirror 700 can include a polygon mirror.

Figure 14:
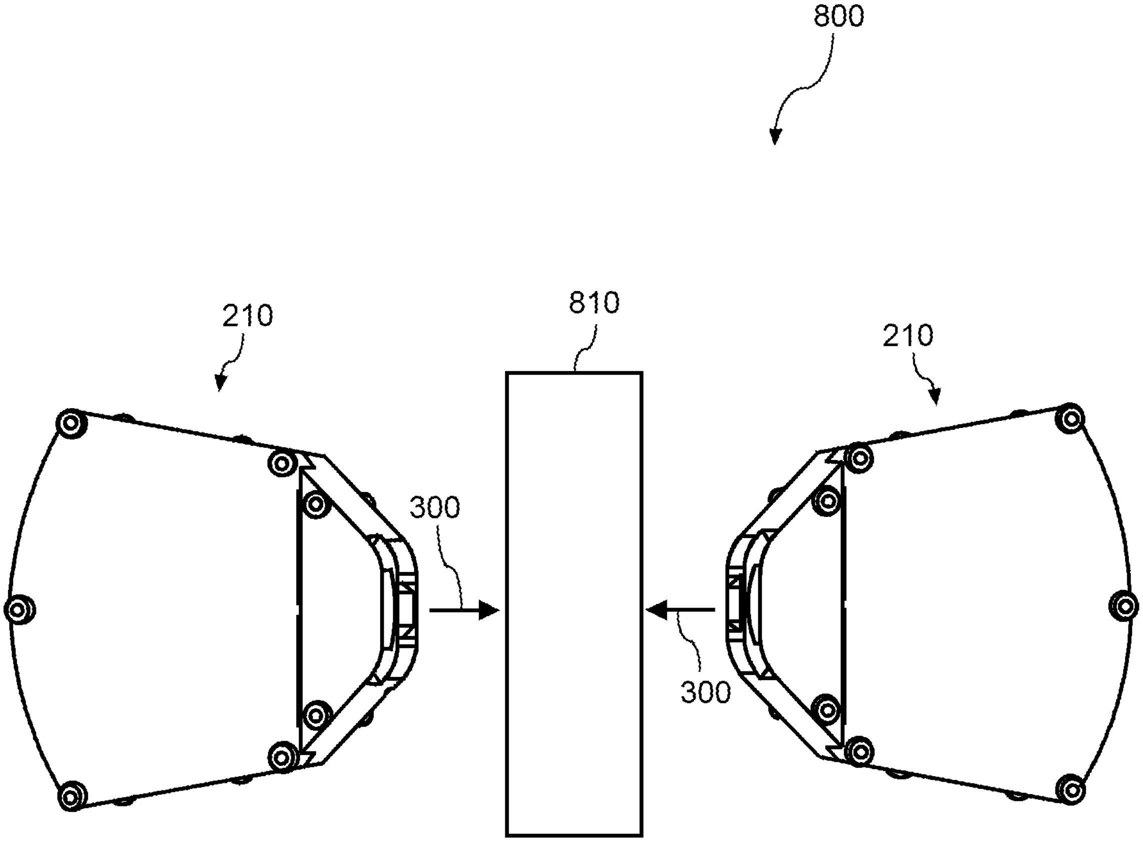
FIG. 14 depicts a top view of a LIDAR system according to some implementations of the present disclosure.
Figure 15:
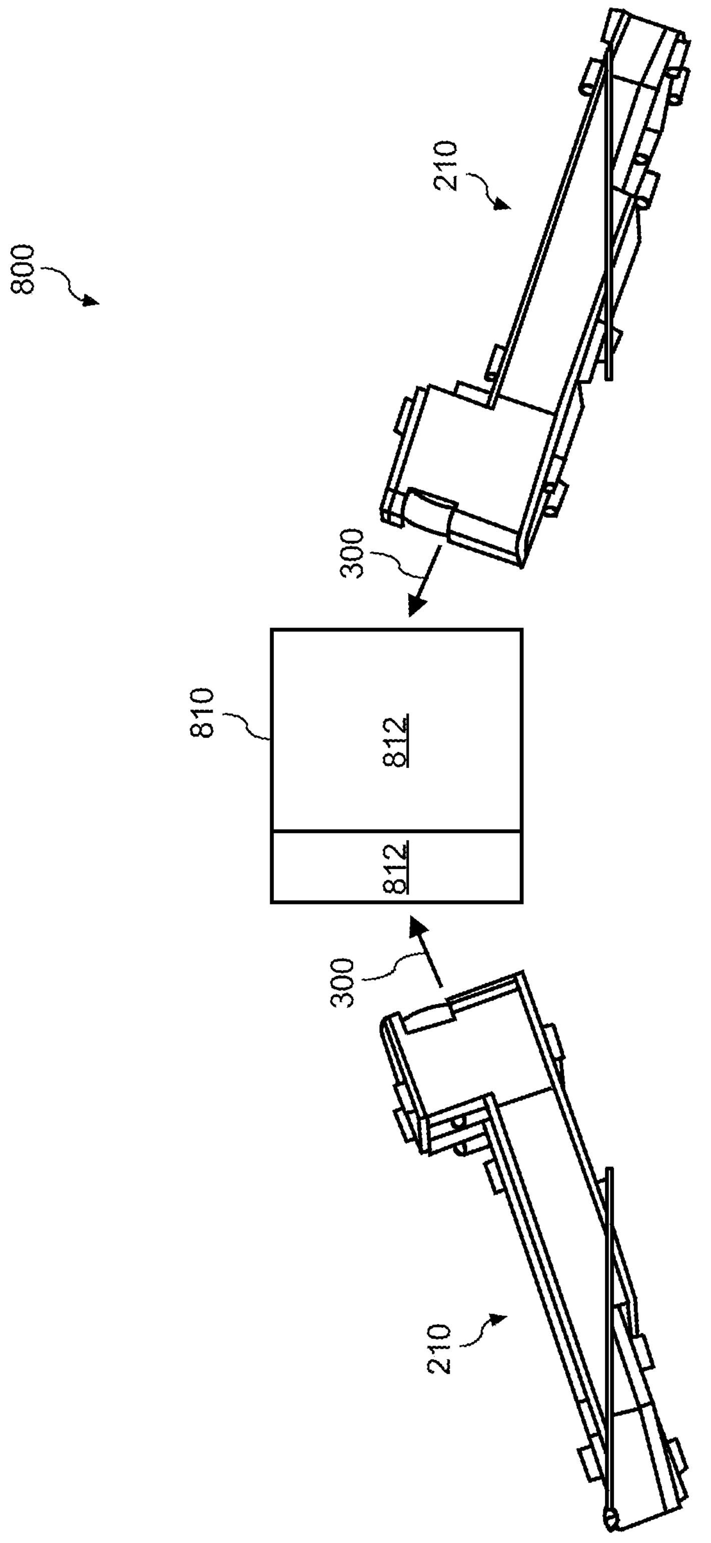
FIG. 15 depicts a side view of the LIDAR system of FIG. 14 according to some implementations of the present disclosure.

Referring now to FIGS. 14 and 15, a LIDAR system 800 is provided according to some implementations of the present disclosure. FIG. 14 depicts a top view of the LIDAR system 800. FIG. 15 depicts a side view of the LIDAR system 800. As shown, the LIDAR system 800 can include two of the housings 210 of the LIDAR system 200 discussed above with reference to FIGS. 2-13. In alternative implementations, the LIDAR system 800 can include more or fewer of the housings 210.

As shown, the LIDAR system 800 can include an optic 810 positioned relative to the housings 210 such that the plurality of transmit signals 300 exiting each of the housings 210 are directed onto the optic 810, as shown in FIG. 15. In some implementations, the optic 810 can have a plurality of reflective surfaces 812. In this manner, the plurality of transmit signals 300 can reflect off of one of the plurality of reflective surfaces 812.

In some implementations, the optic 810 can be rotatable about an axis. In this manner, the plurality of transmit signals 300 reflecting off of the optic 810 can be directed in different directions. It should be understood that the optic 810 can rotate about the axis at any suitable speed. For instance, in some implementations, the optic 810 can rotate about the axis at a speed ranging from about 1100 revolutions per minute to about 1500 revolutions per minute.

Figure 16:
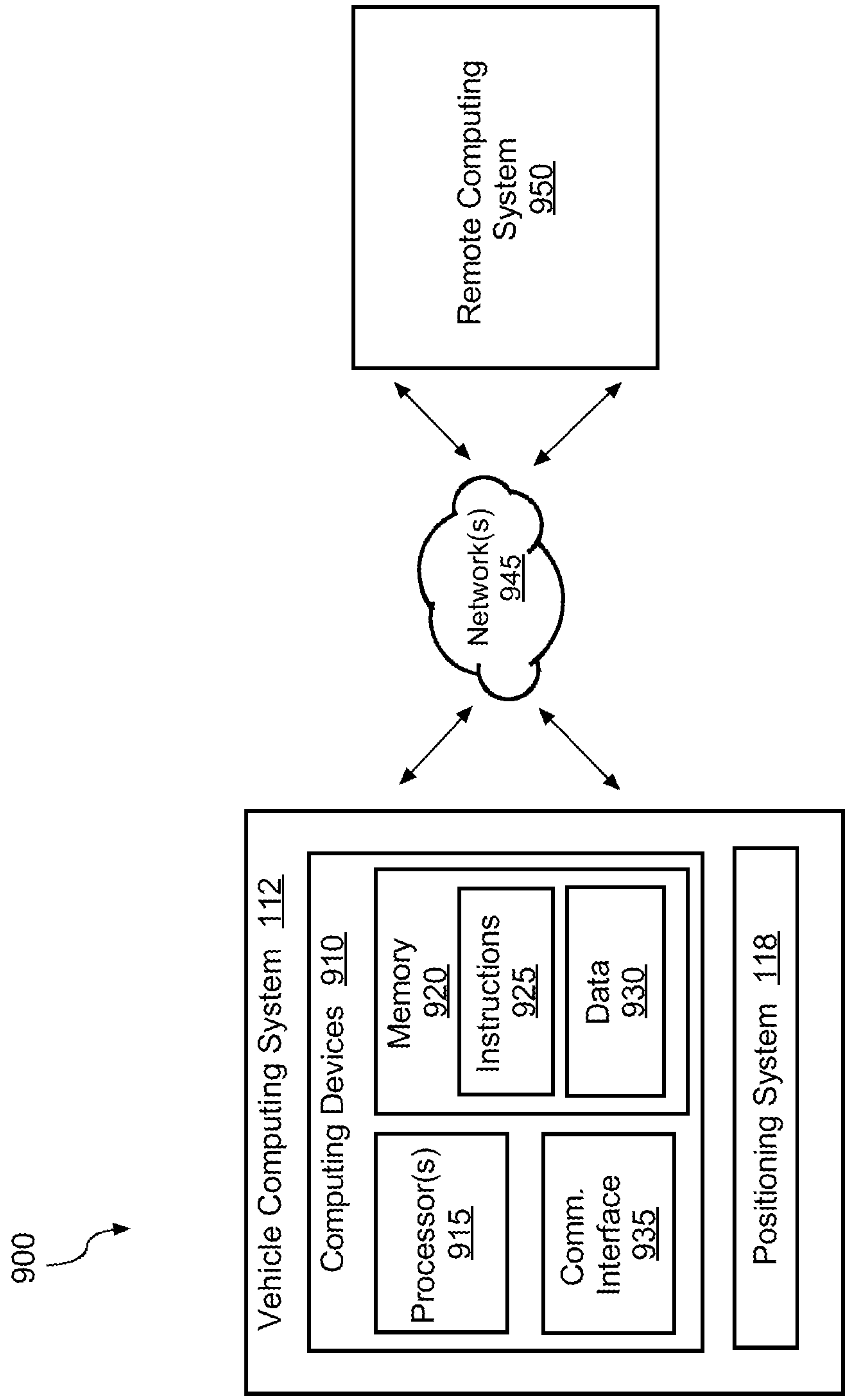
FIG. 16 depicts an example computing system according to some implementations of the present disclosure.

FIG. 16 depicts system components of a computing system 900 according to some implementations of the present disclosure. The computing system 900 can include the vehicle computing system 112 and one or more remote computing system(s) 950 that are communicatively coupled to the vehicle computing system 112 over one or more network(s) 945. The computing system 900 can include one or more computing device(s) 910. The computing device(s) 910 of the vehicle computing system 112 can include processor(s) 915 and a memory 920. The one or more processors 815 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, etc., and combinations thereof.

The memory 920 can store information that can be accessed by the one or more processors 915. For instance, the memory 920 (e.g., one or more non-transitory computer-readable storage mediums, memory devices) can include computer-readable instructions 925 that can be executed by the one or more processors 915. The computer-readable instructions 925 can be software written in any suitable programming language or can be implemented in hardware. Additionally, or alternatively, the computer-readable instructions 925 can be executed in logically and/or virtually separate threads on processor(s) 915.

For example, the memory 920 can store the computer-readable instructions 925 that, when executed by the one or more processors 915, cause the one or more processors 915 to perform operations such as any of the operations and functions for which the computing systems are configured, as described herein.

The memory 920 can store data 930 that can be obtained, received, accessed, written, manipulated, created, and/or stored. The data 930 can include, for instance, sensor data obtained via the LIDAR system 800 (shown in FIGS. 14 and 15), and/or other data/information described herein. In some implementations, the computing device(s) 910 can obtain from and/or store data in one or more memory device(s) that are remote from the computing system 900, such as one or more memory devices of the remote computing system 950.

The computing device(s) 910 can also include a communication interface 935 used to communicate with one or more other system(s) (e.g., remote computing system 950). The communication interface 935 can include any circuits, components, software, etc. for communicating via one or more networks (e.g., 945). In some implementations, the communication interface 935 can include for example, one or more of a communications controller, receiver, transceiver, transmitter, port, conductors, software and/or hardware for communicating data/information.

The network(s) 945 can be any type of network or combination of networks that allows for communication between devices. In some implementations, the network(s) 945 can include one or more of a local area network, wide area network, the Internet, secure network, cellular network, mesh network, peer-to-peer communication link and/or some combination thereof and can include any number of wired or wireless links. Communication over the network(s) 945 can be accomplished, for instance, via a network interface using any type of protocol, protection scheme, encoding, format, packaging, etc.

FIG. 16 illustrates one example computing system 900 that can be used to implement the present disclosure. Other computing systems can be used as well without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure.

Figure 17:
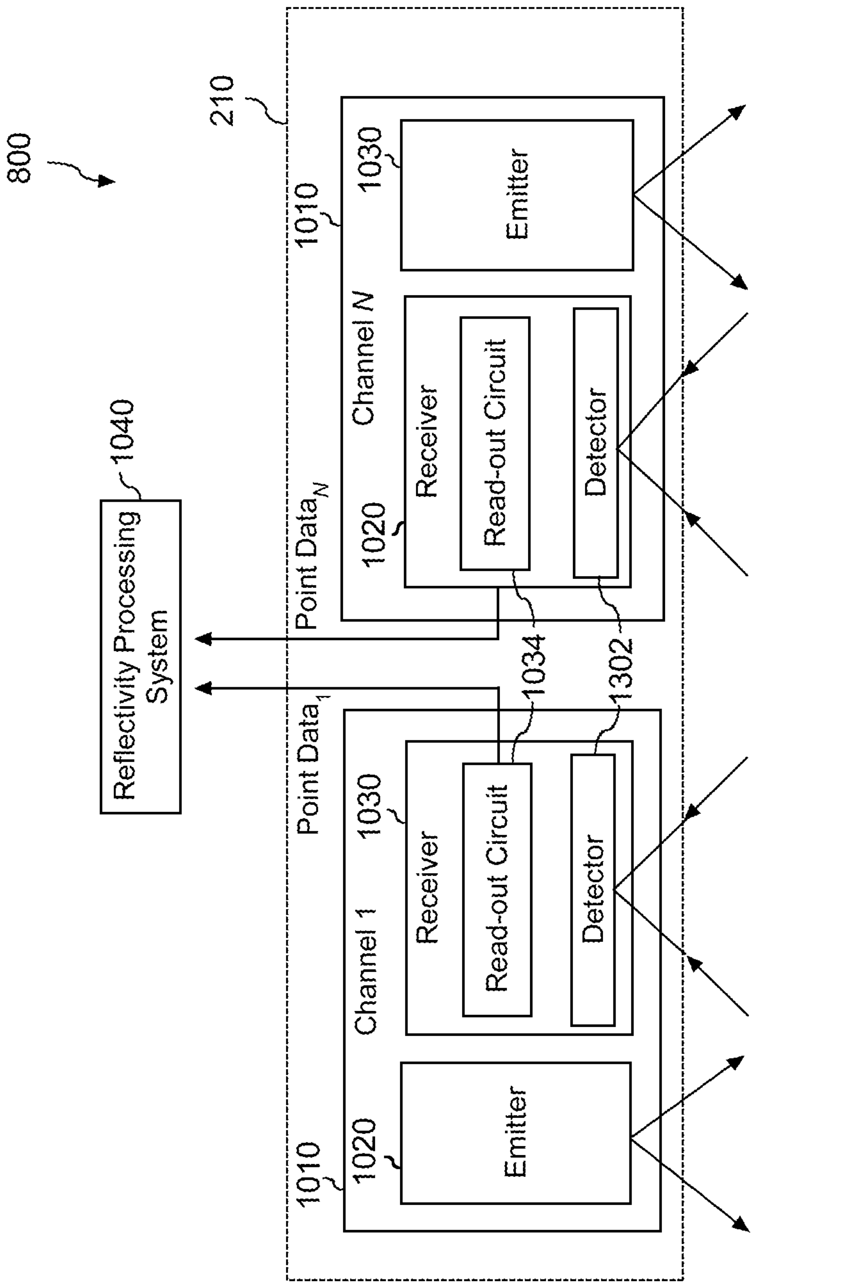
FIG. 17 depicts a block diagram of components of a LIDAR system according to some implementations of the present disclosure.

Referring now to FIG. 17, a block diagram of the LIDAR system 800 is provided according to some implementations of the present disclosure. It should be understood that the LIDAR system 800 can be included as part of the sensors 114 discussed above with reference to FIG. 1. As shown, the LIDAR system 800 can include multiple channels 1010; specifically, channels 1-N are illustrated. It should be understood that channels 1-N can be included in a single housing 210 or may be spread across multiple housings 210. Each channel 1010 can output point data that provides a single point of ranging information. The point data output by each of the channels 1010 (e.g., point $\text{data}_{1\text{-}N}$) can be combined to create a point cloud that corresponds to a three-dimensional representation of the surrounding environment.

As shown, each channel 1010 can include an emitter 1020 paired with a receiver 1030. The emitter 1020 emits a light signal into the environment that is reflected off the surrounding environment and returned back to a detector 1032 (e.g., an optical detector) of the receiver 1030. Each emitter 1020 can have an adjustable power level that controls an intensity of the emitted laser signal. The adjustable power level allows the emitter 1020 to be capable of emitting the laser signal at one of multiple different power levels (e.g., intensities).

The detector 1032 can provide the return signal to a read-out circuit 1034. The read-out circuit 1034 can, in turn, output the point data based on the return signal. The point data can indicate a distance the LIDAR system 800 is from a detected object (e.g., road, pedestrian, vehicle, etc.) that is determined by the read-out circuit 1034 by measuring time-of-flight (ToF), which is the time elapsed time between the emitter 1020 emitting the laser signal (e.g., laser beam) and the receiver 1030 detecting the return signal (e.g., reflected laser beam).

The point data further includes an intensity value corresponding to each return signal. The intensity value indicates a measure of intensity of the return signal determined by the read-out circuit 1034. As noted above, the intensity of the return signal provides information about the surface reflecting the signal and can be used by the autonomy computing system 120 (FIG. 1) for localization, perception, prediction, and/or motion planning. The intensity of the return signals depends on a number of factors, such as the distance of the LIDAR system 800 to the detected object, the angle of incidence at which the emitter 1020 emits the laser signal, temperature of the surrounding environment, the alignment of the emitter 1020 and the receiver 1030, and the reflectivity of the detected surface.

As shown, a reflectivity processing system 1040 receives the point data from the LIDAR system 800 and processes the point data to classify specular reflectivity characteristics of objects. The reflectivity processing system 1040 classifies the specular reflectivity characteristics of objects based on a comparison of reflectivity values derived from intensity values of return signals. In some embodiments, the LIDAR system 800 can be calibrated to produce the reflectivity values. For example, the read-out circuit 1034 or another component of the LIDAR system 800 can be configured to normalize the intensity values to produce the reflectivity values. In these embodiments, the reflectivity values may be included in the point data received by the reflectivity processing system 840 from the LIDAR system 800. In other embodiments, the reflectivity processing system 840 may generate the reflectivity values based on intensity return values included in the point data received from the LIDAR system 800.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 800 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 1010 at each power level can be assigned to the corresponding channel/power level combination. In this way, each power level of each channel of the LIDAR system 800 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 800 to the detected surface, the angle of incidence at which the emitter 1020 emits the laser signal, temperature of the surrounding environment, and/or the alignment of the emitter 1020 and the receiver 1030.

Figure 18:
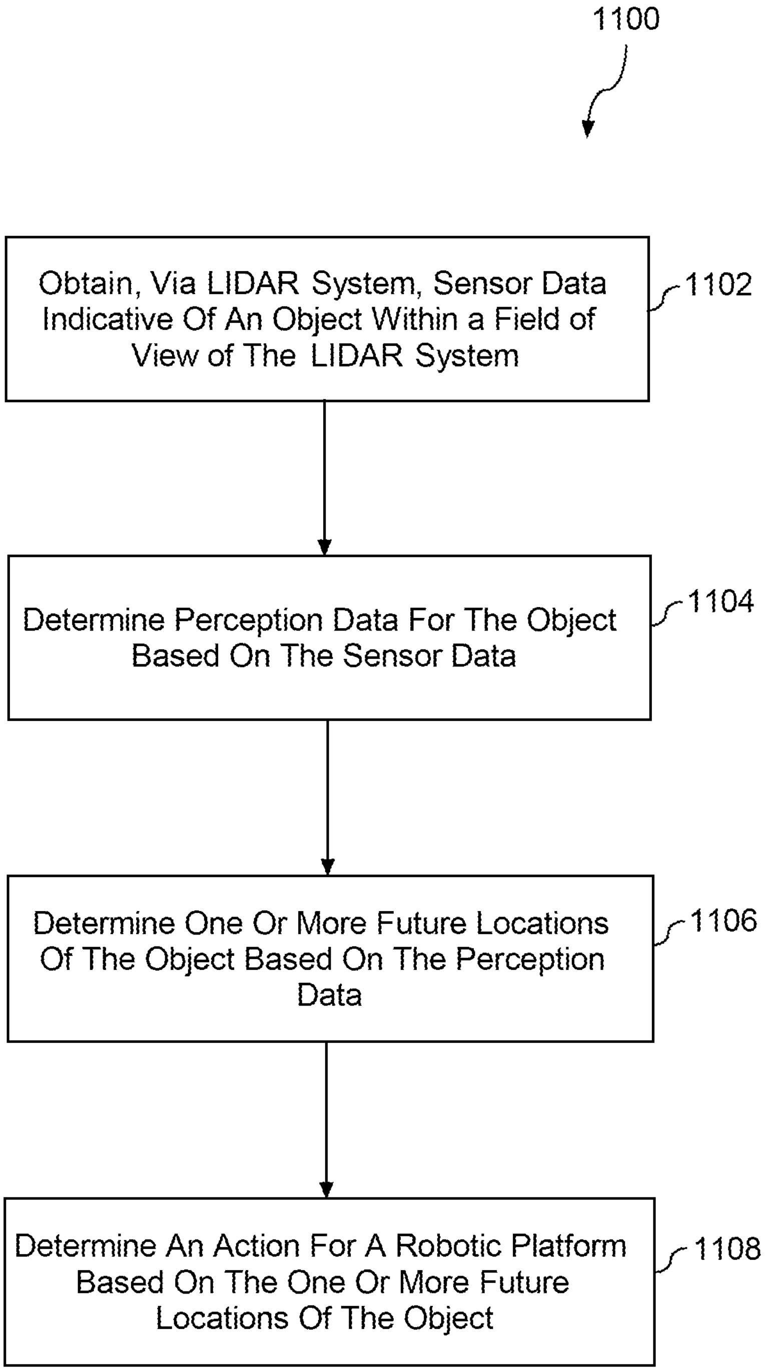
FIG. 18 depicts a flow diagram of a method of controlling operation of an autonomous vehicle according to sensor data obtained from a LIDAR system according to some implementations of the present disclosure.

Referring now to FIG. 18, a flowchart diagram of an example method 1100 of controlling operation of a robotic platform (or other device) a LIDAR system is provided according to some implementations of the present disclosure. One or more portion(s) of the method 1100 can be implemented by a computing system that includes one or more computing devices such as, for example, the computing systems described with reference to the other figures (e.g., the vehicle computing system 112, an autonomous vehicle control system, etc.). Each respective portion of the method 1100 can be performed by any (or any combination) of one or more computing devices. Moreover, one or more portion(s) of the method 1100 can be implemented as an algorithm on the hardware components of the device(s) described herein to, for example, control operation of a robotic platform or other device according to data obtained from the LIDAR system.

FIG. 18 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 18 is described with reference to elements/terms described with respect to other systems and figures for exemplary illustrated purposes and is not meant to be limiting. One or more portions of method 1100 can be performed additionally, or alternatively, by other systems.

At (1102), the method 1100 can include obtaining, via the LIDAR system, sensor data indicative of an object within a field of view of the LIDAR system. For example, as described herein, the LIDAR system can include a plurality of emitters (e.g., laser diodes) respectively configured to emit a light signal along the transmit path. The LIDAR system can further include a plurality of first optics disposed along the transmit path.

In some implementations, the plurality of first optics can include a collimator optic having a primary optical power along a first axis (e.g., first axis). In this manner, the collimator optic can be configured to collimate the light signals emitted from the emitters along the first axis. The plurality of first optics can further include one or more transmit optics. The one or more transmit optics can be positioned between the collimator optic and the plurality of emitters. Furthermore, the one or more transmit optics can have a primary optical power along a second axis (e.g., slow axis) that is perpendicular or substantially perpendicular to the first axis. The light signals can be steered along the one or more transmit optics. In this manner, the LIDAR system can facilitate pre-collimation steering of the light signals prior to being collimated along the first axis via the collimator optic. For instance, the light signals can be steered along the one or more transmit optics to focus the light signals onto the collimator optic. In this manner, collimation of the light signals can be improved.

Each of the light signals can be emitted as a transmit signals of a plurality of transmit signals (e.g., collimated light signals). The transmit signals can reflect off of one or more objects (e.g., pedestrian, street sign, vehicle, etc.) within an environment surrounding the LIDAR system.

The LIDAR system can include a plurality of photodetectors. The photodetectors can be disposed on a curved surface (e.g., Petzval surface) of a circuit board. The LIDAR system can further include a plurality of second optics disposed along a receive path that is separate from the transmit path. In this manner, the plurality of second optics can be positioned along the receive path such that a plurality of reflected light signals (e.g., reflected transmit signals) pass through the plurality of second optics.

In some implementations, the plurality of second optics include one or more receive optics. The one or more receive optics are configured to focus the plurality of reflected light beams onto the photodetectors. For instance, in some implementations, the one or more receive optics can include at least one aspheric lens. For instance, in some implementations, the one or more receive optics can include a first aspheric lens positioned a first distance from the photodetectors and a second aspheric lens positioned a second distance from the photodetectors. In some implementations, the first aspheric lens and the second aspheric lens can each include a first aspheric surface and a second aspheric surface.

In some implementations, the plurality of second optics can include a plurality of condenser optics. The plurality of condenser optics can be positioned along the receive path between the one or more receive optics and a corresponding photodetector of the plurality of photodetectors. Each of the condenser optics can be configured to condense one or more of the plurality of reflected light signals onto the corresponding photodetector. In some implementations, each of the condenser optics can be configured to condense all of the reflected light signals onto the corresponding photodetector. In this manner, a field of view of the photodetectors can be widened due, at least in part, to the plurality of condenser optics. It should be understood that the LIDAR system can generate sensor data based, at least in part, on the reflected light signals detected by the plurality of photodetectors.

A computing system (e.g., an autonomous vehicle control system) can perform one or more actions/operations for a robotic platform (e.g., autonomous vehicle) or another based at least in part on the sensor data (e.g., collected through the LIDAR system at 1102). This can include, for example, one or more of the operations at (1104) to (1108) to determine an object in a surrounding environment, predict the motion of the object, plan/control the motion of the robotic platform, activate components on-board the robotic platform, etc. The computing system (e.g., autonomous vehicle control system) can provide one or more control signals for the robotic platform or another device (e.g., an autonomous vehicle) to perform any of these one or more actions/operations based at least in part on the sensor data.

For example, at (1104), the method 1100 can include determining perception data for the object based, at least in part, on the sensor data obtained at (1102). The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. For example, a robotic platform or another device can determined the perception data by processing the LIDAR data collected through the LIDAR system at (1102) and using one or more machine-learned model(s) that are trained to identify and classification objects within the surrounding environment.

At (1106), the method 1100 can include determining one or more future locations of the object based, at least in part, on the perception data for the object. For example, a robotic platform or another device can generate a trajectory (e.g., including one or more waypoints) that is indicative of a predicted future motion of the object, given the object's heading, velocity, type, etc. over current/previous timestep (s).

At (1108), the method 1100 can include determining an action for the robotic platform or another device based at least in part on the one or more future locations of the object. For example, an autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions. In another example, the autonomous vehicle can activate one or more lights, generate one or more use interfaces (e.g., for display through a display device of the vehicle), etc. based at least in part on the processing of the LIDAR data, as described herein.

While the present subject matter has been described in detail with respect to specific some implementations and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light detection and ranging (LIDAR) system comprising:

a plurality of emitters, at least one of the emitters configured to emit a light signal along a transmit path; and a plurality of first optics along the transmit path, the plurality of first optics comprising a collimator optic having a primary optical power along a first axis and one or more transmit optics having a primary optical power along a second axis, the one or more transmit optics positioned between the collimator optic and the plurality of emitters, wherein the first axis is a fast axis and the second axis is a slow axis, and wherein the light signal encounters a lower index of refraction and travels faster through the collimator optic having the primary optical power along the fast axis than through the one or more transmit optics having the primary optical power along the slow axis.

2. The LIDAR system of claim 1, wherein the second axis is perpendicular or substantially perpendicular to the first axis.

3. The LIDAR system of claim 1, wherein:

the primary optical power of the collimator optic along the first axis is indicative of a degree to which the collimator optic converges or diverges the light signals along the first axis; and the primary optical power of the one or more transmit optics along the second axis is indicative of a degree to which the one or more transmit optics converge or diverge the light signals along the second axis.

4. The LIDAR system of claim 1, wherein the primary optical power of the collimator optic along the first axis is greater than the optical power of the collimator optic along any other axis, and wherein the primary optical power of the one or more transmit optics along the second axis is greater than the optical power of the transmit optics along any other axis.

5. The LIDAR system of claim 1, wherein the one or more transmit optics comprise one or more toroidal shaped optics, the one or more toroidal shaped optics defining a circumferential direction and a radial direction.

6. The LIDAR system of claim 5, wherein the one or more toroidal shaped optics has a constant thickness along the circumferential direction.

7. The LIDAR system of claim 1, wherein:

the collimator optic has a first focal length; and the one or more transmit optics have a second focal length, the second focal length being longer than the first focal length.

8. The LIDAR system of claim 7, wherein a ratio of the second focal length to the first focal length is ranges from 16:1 to 24:1.

9. The LIDAR system of claim 1, wherein one or more of the plurality of emitters comprise a laser diode.

10. The LIDAR system of claim 1, further comprising:

a plurality of photodetectors, one or more of the photodetectors disposed along a curved surface of a circuit board; and a plurality of second optics positioned along a receive path such that a plurality of reflected light signals traveling along the receive path pass through the plurality of second optics.

11. The LIDAR system of claim 10, wherein one or more of the plurality of photodetectors comprise an avalanche photodiode.

12. The LIDAR system of claim 10, wherein the curved surface comprises a Petzval surface.

13. The LIDAR system of claim 10, wherein the plurality of second optics comprise:

one or more receive optics; and a plurality of condenser optics, at least one of the condenser optics positioned between the one or more receive optics and a corresponding photodetector of the plurality of photodetectors.

14. The LIDAR system of claim 10, further comprising:

a housing that includes a partition wall dividing an interior of the housing into a first cavity and a second cavity;

the plurality of emitters and the plurality of first optics disposed within the first cavity; and the plurality of photodetectors and the plurality of second optics disposed within the second cavity.

15. A light detection and ranging (LIDAR) system comprising:

a plurality of emitters, at least one of the emitters configured to emit a light signal along a transmit path;

a plurality of first optics along the transmit path, the plurality of first optics comprising a collimator optic having a primary optical power along a first axis and one or more transmit optics having a primary optical power along a second axis, the one or more transmit optics positioned between the collimator optic and the plurality of emitters, wherein the first axis is a fast axis and the second axis is a slow axis; and a mirror positioned along the transmit path such that the mirror is positioned between the one or more transmit optics and the plurality of emitters, the mirror rotatable about the first axis or the second axis.

16. The LIDAR system of claim 15, wherein the mirror is rotatable about the first axis at a rotational speed ranging from about 15,000 revolutions per minute to about 20,000 revolutions per minute.

17. The LIDAR system of claim 15, wherein the mirror comprises a polygon mirror.

18. An autonomous vehicle control system comprising:

a LIDAR system comprising:

a plurality of emitters, at least one of the emitters configured to emit a light signal along a transmit path; and a plurality of first optics along the transmit path, the plurality of first optics comprising a collimator optic having a primary optical power along a first axis and one or more transmit optics having a primary optical power along a second axis, the one or more transmit optics positioned between the collimator optic and the plurality of emitters, wherein the first axis is a fast axis and the second axis is a slow axis, wherein the primary optical power of the collimator optic along the first axis is greater than the optical power of the collimator optic along any other axis, and wherein the primary optical power of the one or more transmit optics along the second axis is greater than the optical power of the transmit optics along any other axis.

19. An autonomous vehicle comprising:

a LIDAR system comprising:

a plurality of emitters, at least one of the emitters configured to emit a light signal along a transmit path; and a plurality of first optics along the transmit path, the plurality of first optics comprising a collimator optic having a first focal length and a primary optical power along a first axis and one or more transmit optics having a second focal length and a primary optical power along a second axis, the one or more transmit optics positioned between the collimator optic and the plurality of emitters, wherein the first axis is a fast axis and the second axis is a slow axis, and the second focal length being longer than the first focal length.

* * * * *